US012145320B2

(12) United States Patent
Gupta et al.

(10) Patent No.: US 12,145,320 B2
(45) Date of Patent: Nov. 19, 2024

(54) PREEMPTIVE APPARATUS FAILURE DETECTION IN ADDITIVE MANUFACTURING

(71) Applicant: Carbon, Inc., Redwood City, CA (US)

(72) Inventors: Akruti M. Gupta, San Jose, CA (US); Devlin David Stewart, Los Altos Hills, CA (US); Gabriel Alfonso Navarro, Oakland, CA (US); Hunter Alex van Adelsberg, Palo Alto, CA (US)

(73) Assignee: Carbon, Inc., Redwood City, CA (US)

( * ) Notice: Subject to any disclaimer, the term of this patent is extended or adjusted under 35 U.S.C. 154(b) by 406 days.

(21) Appl. No.: 17/596,754

(22) PCT Filed: May 27, 2020

(86) PCT No.: PCT/US2020/034625
§ 371 (c)(1),
(2) Date: Dec. 17, 2021

(87) PCT Pub. No.: WO2020/263482
PCT Pub. Date: Dec. 30, 2020

(65) Prior Publication Data
US 2022/0297382 A1    Sep. 22, 2022

Related U.S. Application Data

(60) Provisional application No. 62/865,451, filed on Jun. 24, 2019.

(51) Int. Cl.
*B33Y 50/02* (2015.01)
*B29C 64/124* (2017.01)
(Continued)

(52) U.S. Cl.
CPC .......... *B29C 64/393* (2017.08); *B29C 64/124* (2017.08); *B29C 64/264* (2017.08);
(Continued)

(58) Field of Classification Search
CPC ... B29C 64/393; B29C 64/124; B29C 64/264; B29C 64/364; B29C 64/30; B33Y 30/00;
(Continued)

(56) References Cited

U.S. PATENT DOCUMENTS 5,236,637 A    8/1993  Hull
5,391,072 A    2/1995  Lawton et al.
(Continued)

FOREIGN PATENT DOCUMENTS

EP    2172887 A2    4/2010
WO    2018006018 A1    1/2018
WO    2018006029 A1    1/2018

OTHER PUBLICATIONS

International Search Report and Written Opinion corresponding to PCT/US2020/034625; dated Sep. 14, 2020 (12 pages).
(Continued)

*Primary Examiner* — Christopher E. Everett
(74) *Attorney, Agent, or Firm* — Myers Bigel, P.A.

(57) ABSTRACT

Systems, methods, and devices may be configured to detect and remediate component failures in three-dimensional object printers (10, 10a-f) preemptively. For example, systems may include: (a) a plurality of printers (10, 10a-f) each configured to produce three-dimensional objects (13), each printer including: (i) a plurality of subsystems; and (ii) at least one sensor; and (b) processor(s) (41, 42) and memory resource(s) (21) storing an inventory of available replacement components for at least some of said subsystems. The one or more memory resources may (21) store instructions that may cause the one or more processors to: (i) identify a predetermined pattern in data sensed during a process of producing a three-dimensional object by a sensor of a printer as an indicator of likely failure of a subsystem or component thereof; and (ii) assign a component in inventory to said
(Continued)

printer based on a unique identifier of the printer and the indicator of likely failure identified in the signal.

14 Claims, 7 Drawing Sheets

(51) Int. Cl.
*B29C 64/264* (2017.01)
*B29C 64/364* (2017.01)
*B29C 64/393* (2017.01)
*B33Y 30/00* (2015.01)

(52) U.S. Cl.
CPC ............ *B29C 64/364* (2017.08); *B33Y 30/00* (2014.12); *B33Y 50/02* (2014.12)

(58) Field of Classification Search
CPC .... B33Y 50/02; B33Y 40/00; G05B 19/4099; G05B 2219/45028; G05B 2219/49013; G05B 2219/49018; G05B 19/4065
See application file for complete search history.

(56) References Cited

U.S. PATENT DOCUMENTS

| | | | |
|---|---|---|---|
| 5,529,473 A | 6/1996 | Lawton et al. | |
| 7,438,846 B2 | 10/2008 | John | |
| 7,892,474 B2 | 2/2011 | Shkolnik et al. | |
| 8,110,135 B2 | 2/2012 | El-Siblani | |
| 9,205,601 B2 | 12/2015 | Desimone et al. | |
| 9,211,678 B2 | 12/2015 | Desimone et al. | |
| 9,216,546 B2 | 12/2015 | Desimone et al. | |
| 9,453,142 B2 | 9/2016 | Rolland et al. | |
| 9,598,606 B2 | 3/2017 | Rolland et al. | |
| 9,676,963 B2 | 6/2017 | Rolland et al. | |
| 9,799,010 B1* | 10/2017 | Leise | G06Q 20/10 |
| 2002/0143598 A1* | 10/2002 | Scheer | G06Q 10/06 705/7.26 |
| 2012/0001552 A1* | 1/2012 | Tsai | H05B 45/50 315/129 |
| 2013/0292862 A1 | 11/2013 | Joyce | |
| 2013/0295212 A1 | 11/2013 | Chen et al. | |
| 2015/0134400 A1* | 5/2015 | Kashi | G06Q 10/20 705/28 |
| 2015/0331402 A1 | 11/2015 | Lin et al. | |
| 2015/0360419 A1 | 12/2015 | Willis et al. | |
| 2016/0288376 A1 | 10/2016 | Sun et al. | |
| 2016/0303795 A1* | 10/2016 | Liu | B29C 64/364 |
| 2017/0129167 A1 | 5/2017 | Castanon | |
| 2017/0129169 A1 | 5/2017 | Batchelder et al. | |
| 2018/0126630 A1 | 5/2018 | Panzer et al. | |
| 2018/0243976 A1 | 8/2018 | Feller | |
| 2018/0244034 A1* | 8/2018 | Sutcliffe | B29C 64/255 |
| 2018/0290374 A1 | 10/2018 | Willis et al. | |
| 2018/0322621 A1* | 11/2018 | Craeghs | G06T 7/001 |
| 2019/0163172 A1 | 5/2019 | Daniel et al. | |

OTHER PUBLICATIONS

Januszewicz, Rima, et al., "Layerless fabrication with continuous liquid interface production", PNAS, 113, 2016, 11703-11708.
Poelma, Justin, et al., "Rethinking digital manufacturing with polymers", Science, 358(6369), 2017, 1384-1385.
Tumbleston, John R., et al., "Continuous liquid interface production of 3D Objects", Science, 347(6228), 2015, 1349-1352.

* cited by examiner

M2 oxygen flow (and other telemetry) on print jobs leading up to a vacuum pump failure.

Close-up of Figure 6 detailing rise-time calculation logic.

PREEMPTIVE APPARATUS FAILURE DETECTION IN ADDITIVE MANUFACTURING

CROSS REFERENCE TO RELATED APPLICATIONS

This application is a 35 U.S.C. § 371 national phase application of International Application Serial No. PCT/US2020/034625, filed May 30, 2020, which claims priority to U.S. Provisional Application Ser. No. 62/865,451, filed Jun. 24, 2019, the disclosure of which is hereby incorporated by reference in its entirety.

FIELD OF THE INVENTION

The present invention concerns additive manufacturing apparatus such as stereolithography apparatus, and particularly concerns systems for predicting and avoiding apparatus failure.

BACKGROUND OF THE INVENTION

Additive manufacturing—previously utilized for the production of prototype objects rather than objects for real world use—has recently blossomed into a technology that is revitalizing the manufacturing industry.

The introduction of more rapid additive manufacturing processes sometimes referred to as "continuous liquid interface production" (or "CLIP"), coupled with the introduction of dual cure additive manufacturing resins that produce objects with practical functional properties, have significantly enhanced this field. See J. Tumbleston et al., *Continuous liquid interface production of 3D objects*, SCIENCE 347, 1349-1352 (published online 16 Mar. 2015); U.S. Pat. Nos. 9,211,678; 9,205,601; and 9,216,546 to DeSimone et al.; and R. Janusziewicz, et al., *Layerless fabrication with continuous liquid interface production*, PNAS 113, 11703-11708 (18 Oct. 2016); See also Rolland et al., U.S. Pat. Nos. 9,676,963, 9,453,142 and 9,598,606; J. Poelma and J. Rolland, Rethinking digital manufacturing with polymers, SCIENCE 358, 1384-1385 (15 Dec. 2017).

As additive manufacturing has grown in usefulness, the demands placed on additive manufacturing machines have grown. Machines in a manufacturing environment must maintain satisfactory levels of production speed, accuracy, and reliability. Machine failure can significantly disrupt a manufacturing business and have serious adverse consequences for that business and its customers. Accordingly, there is a need for new approaches to avoiding or minimizing additive manufacturing machine failure.

SUMMARY

Some aspects of the present disclosure provide for preemptive detection of failures in additive manufacturing methods or apparatuses, and some aspects may include remediating potential failures. For example, one general aspect provides a system for preemptively detecting and remediating component failures in printers of three-dimensional objects. The system may include (a) a plurality of printers each configured to produce three-dimensional objects, with each printer including: (i) a plurality of subsystems; (ii) at least one sensor, and (iii) a unique identifier for the printer. The system may also include one or more processors and one or more memory resources storing an inventory of available replacement components for at least some of the printer subsystems. The one or more memory resources may also store instructions that, when executed by the one or more processors, cause the one or more processors to: (i) identify a predetermined pattern in a signal including data sensed during a process of producing a three-dimensional object by the at least one sensor of a printer of the plurality of printers as an indicator of likely failure of a subsystem or component thereof in that printer including said at least one sensor; and (ii) assign a component in inventory to said printer based on the unique identifier of the printer and the indicator of likely failure identified in the signal.

In some aspects, the system may include a stereolithography (SLA) apparatus, a selective laser sintering (SLS) apparatus, a fused deposition modeling (FDM) apparatus, or a multi jet fusion (MJR) apparatus. Each of the printers may be a bottom-up stereolithography apparatus.

In some aspects, the one or more processors may include a processor that is remote from the plurality of printers.

In some aspects, the one or more memory resources may store a physical location for each of said printers based on the unique identifier of the respective printer. Assigning a component in inventory may include assigning a delivery destination to that component based on the physical location. Optionally, the one or more processors may be further configured to generate a notice to a service technician that the component is to be replaced in the printer to which the component is assigned.

In some aspects, the plurality of printers may be located (e.g., physically located) in two or more separate zones, and the inventory of components may be subdivided into two or more separate inventory locations. Each inventory location may be assigned to one of said zones. Assigning a component in inventory to said printer may include assigning a component in the inventory location corresponding to the zone in which said printer is located. Optionally, the one or more processors may be further configured to generate a notice to a service technician assigned to that zone.

In some aspects, the plurality of subsystems may include: a printer controller, a drive system, a light engine, a power supply, optionally a polymerization inhibitor supply (e.g., one comprising an oxygen supply (e.g., one including an oxygen concentrator), an inhibitory light engine), and optionally a temperature regulation system (e.g., a heating and/or cooling system).

In some aspects, the at least one sensor may include a gas flow sensor, an oxygen concentration sensor, a gas pressure sensor, a light output sensor, a current sensor, a component temperature sensor, a force sensor (e.g., operatively associated with a window or a build platform), a build platform position sensor, or any combination thereof.

In some aspects, the one or more memory resources may store instructions that, when executed by the one or more processors, cause the one or more processors to: (iii) receive a confirmation that said assigned component in inventory has been installed in said printer in place of said subsystem or component thereof for which an indicator of likely failure has been received; and (iv) create a log of all subsystems or components thereof that have been replaced in each printer, and/or a log of all printers in which said subsystem or component thereof has been replaced.

In some aspects, the subsystem may include a fluid inhibitor flow circuit (e.g., an oxygen-enriched gas), the component may include a vacuum pump (e.g., a diaphragm pump) operatively associated with said fluid inhibitor flow circuit, the at least one sensor may include a fluid flow sensor operatively associated with said fluid inhibitor flow circuit, and the predetermined pattern may include a delayed onset to a desired flow rate of said fluid inhibitor in said fluid flow circuit.

In some aspects, the subsystem may include a light engine; the component may include a light source (e.g., a light emitting diode or diode array); the at least one sensor may include a (i) current sensor or (ii) light sensor operatively associated with said light engine; and the predetermined pattern may include (i) an increase in current required to drive said light source to a predetermined intensity, or (ii) a decrease in the maximum intensity attainable from said light source (e.g., a decrease in the maximum intensity attainable from an LED or LED array when driven at maximum current).

In some aspects, the subsystem may include a polymerization inhibitor source; the component may include an oxygen concentrator; the at least one sensor may include an oxygen concentration sensor operatively associated with said oxygen concentrator; and the predetermined pattern may include an increase in time required to reach a predetermined oxygen concentration or an inability to reach a predetermined oxygen concentration.

The foregoing and other objects and aspects of the present invention are explained in greater detail in the drawings herein and the specification set forth below. The disclosures of all United States patent references cited herein are to be incorporated herein by reference.

DETAILED DESCRIPTION OF ILLUSTRATIVE EMBODIMENTS

Figure 1:
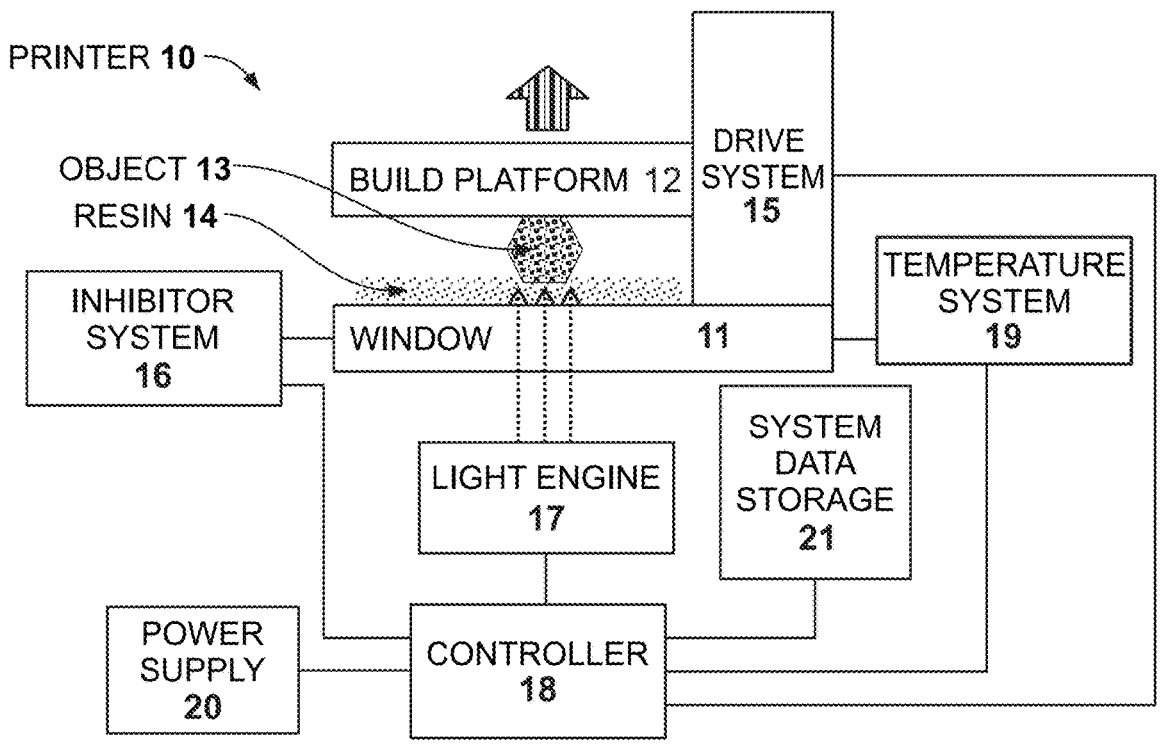
FIG. 1 schematically illustrates one example of an individual additive manufacturing apparatus with which the present invention can be implemented.

The present invention is now described more fully hereinafter with reference to the accompanying drawings, in which embodiments of the invention are shown. This invention may, however, be embodied in many different forms and should not be construed as limited to the embodiments set forth herein; rather these embodiments are provided so that this disclosure will be thorough and complete and will fully convey the scope of the invention to those skilled in the art.

As used herein, the term "and/or" includes any and all possible combinations of one or more of the associated listed items, as well as the lack of combinations when interpreted in the alternative ("or").

1. Additive Manufacturing Apparatus

Suitable additive manufacturing apparatus for use as described herein include bottom-up and top-down additive manufacturing apparatus, as known and described in, for example, U.S. Pat. No. 5,236,637 to Hull, U.S. Pat. Nos. 5,391,072 and 5,529,473 to Lawton, U.S. Pat. No. 7,438,846 to John, U.S. Pat. No. 7,892,474 to Shkolnik, U.S. Pat. No. 8,110,135 to El-Siblani, U.S. Patent Application Publication No. 2013/0292862 to Joyce, and U.S. Patent Application Publication No. 2013/0295212 to Chen et al. The disclosures of these patents and applications are incorporated by reference herein in their entirety.

In some embodiments, the additive manufacturing step is carried out by one of the family of methods sometimes referred to as as continuous liquid interface production (CLIP). CLIP is known and described in, for example, U.S. Pat. Nos. 9,211,678; 9,205,601; 9,216,546; and others; in J. Tumbleston et al., Continuous liquid interface production of 3D Objects, *Science* 347, 1349-1352 (2015); and in R. Janusziewcz et al., Layerless fabrication with continuous liquid interface production, *Proc. Natl. Acad. Sci. USA* 113, 11703-11708 (2016). Other examples of methods and apparatus for carrying out particular embodiments of CLIP include, but are not limited to: Batchelder et al., U.S. Patent Application Pub. No. 2017/0129169 (May 11, 2017); Sun and Lichkus, U.S. Patent Application Pub. No. 2016/0288376 (Oct. 6, 2016); Willis et al., U.S. Patent Application Pub. No. 2015/0360419 (Dec. 17, 2015); Lin et al., U.S. Patent Application Pub. No. 2015/0331402 (Nov. 19, 2015); D. Castanon, U.S. Patent Application Pub. No. 2017/0129167 (May 11, 2017). B. Feller, U.S. Pat App. Pub. No. 2018/0243976 (published Aug. 30, 2018); M. Panzer and J. Tumbleston, U.S. Pat App Pub. No. 2018/0126630 (published May 10, 2018); and K. Willis and B. Adzima, U.S. Pat App Pub. No. 2018/0290374 (Oct. 11, 2018).

In some embodiments, the apparatus is a bottom-up apparatus (including but not limited to apparatus for carrying out CLIP) that employs a removable window cassette, such as described in B. Feller et al., *Three-dimensional printing with build plates having reduced pressure and/or channels for increased fluid flow*, PCT Patent Application Pub. No. WO 2018/006029, or B. Feller et al., *Three-dimensional printing method and apparatus for reducing bubbles by de-gassing through build plate*, PCT Patent Application Pub. No. WO 2018/006018 (where "build plate" refers to "window cassette"). Examples of preferred apparatus include the M1 and M2 printers available from Carbon Inc., 1089 Mills Way, Redwood City, CA 94063 USA.

FIG. 1 schematically illustrates one non-limiting example of an additive manufacturing apparatus 10. Lines are included to show basic connections between subsystems, but additional connections (such as from the power supply 20 to various subsystems) are omitted for clarity. In general, the illustrated system includes a light transmissive window (which may be a removable window cassette) 11 facing a build platform 12 on which an object 13 may be produced from a light polymerizable resin 14. A light engine (such as an ultraviolet light source coupled with a micromirror array, LCD screen, or the like, with suitable associated optics) 17 is positioned to project spatially and temporally patterned light through the window, and a drive system 15 is operatively associated with the build platform 12 (the platform itself preferably removably mounted to the drive system) for advancing the build platform away from the window as the growing three-dimensional object increases in size.

An inhibitor system 16 is operatively associated with the window, in the illustrated embodiment. In some embodiments, the inhibitor system provides or feeds a chemical inhibitor such as oxygen to the window; in other embodiments, the inhibitor system projects an inhibitory light to the window; all as discussed in the references noted above. In still other embodiments, the inhibitor system can be omitted.

A temperature regulation system 17 is also operatively associated with the window, or the resin, in the illustrated embodiment. Any suitable temperature regulation system can be used, including heaters (such as resistive heaters that are thermally connected to the window itself; IR heaters that project through the window and are tuned to preferentialy heat the resin, etc.), coolers such as Peltier coolers, and combinations thereof.

Various subsystems are typically controlled by a controller 18, which may be one or more processors and one or more memories operatively associated with the processors, the memories storing instructions which when executed cause the controller to carry out an additive manufacturing process on the apparatus. Each of the subsystems may include one or more sensors (not shown, but as discussed further below) for collecting data that can be stored in a system data storage device 21.

The controller 18 can be a server dedicated to each printer carrying out high level printer control coupled with a microcontroller performing low level hardware controls. (for example, the server would control which image is displayed by light engine 17, and instruct the microcontroller to turn on the light source, and the microcontroller can perform moment to moment intensity control on the light being projected).

The server itself can be a high powered computer with a microcontroller (allowing local slicing of data files for printing), or a low powered computer with a microcontroller that can only run pre-sliced or predetermined print programs). In the latter case, the low power server may be performing less high level printer control, with more control being exerted on it from a master, remote, or cloud controller. This may be advantageous in, for example, a factory setting where a central server or a cloud computer queues numerous different projects to different printers in that factory.

While FIG. 1 shows a "bottom up" stereolithography apparatus, the systems of the present invention as discussed further below can also be implemented with "top down" stereolithography apparatus. In addition to these types of stereolithography (SLA) apparatus, the present invention can also be implemented with other types of additive manufacturing apparatus (or "printers"), including but not limited to selective laser sintering (SLS) apparatus, fused deposition modeling (FDM) apparatus, and multi jet fusion (MJF) apparatus.

2. Systems Implementing Preemptive Failure Detection

Some aspects of the present disclosure provide for preemptive detection of failures in additive manufacturing methods or apparatuses, and some aspects may include remediating potential failures. For example, one general aspect provides a system for preemptively detecting and remediating component failures in printers of three-dimensional objects. The system may include (a) a plurality of printers each configured to produce three-dimensional objects, with each printer including: (i) a plurality of subsystems; (ii) at least one sensor, and (iii) a unique identifier for the printer. The system may also include one or more processors and one or more memory resources storing an inventory of available replacement components for at least some of the printer subsystems. The one or more memory resources may also store instructions that, when executed by the one or more processors, cause the one or more processors to: (i) identify a predetermined pattern in a signal including data sensed during a process of producing a three-dimensional object by the at least one sensor of a printer of the plurality of printers as an indicator of likely failure of a subsystem or component thereof in that printer including said at least one sensor; and (ii) assign a component in inventory to said printer based on the unique identifier of the printer and the indicator of likely failure identified in the signal.

In some systems, each of said printers includes a stereolithography (SLA) apparatus, a selective laser sintering (SLS) apparatus, a fused deposition modeling (FDM) apparatus, or a multi-jet fusion (MJR) apparatus.

In some systems, each printer may include a bottom-up stereolithography apparatus.

In some systems, the one or more processors may include a processor that is remote from said plurality of printers.

In some systems, the one or more memory resources store a physical location for each of said printers based on the unique identifier of the respective printer. Assigning a component in inventory may include assigning a delivery destination to that component based on the physical location. Optionally, said one or more processors may be further configured to generate a notice to a service technician that the component is to be replaced in the printer to which the component is assigned.

In some systems, the plurality of printers are located in two or more separate zones. The inventory of components may be subdivided into two or more separate inventory locations, with each inventory location assigned to one of said zones. Assigning a component in inventory to said printer may include assigning a component in the inventory location corresponding to the zone in which said printer is located. Optionally, the one or more processors may be further configured to generate a notice to a service technician assigned to that zone.

In some systems, the plurality of subsystems of each printer includes: a printer controller, a drive system, a light engine, a power supply, optionally a polymerization inhibitor supply (e.g., one including an oxygen supply (e.g., one including an oxygen concentrator), an inhibitory light engine), and optionally a temperature regulation system (e.g., a heating and/or cooling system).

In some systems, the at least one sensor of each printer includes a gas flow sensor, an oxygen concentration sensor, a gas pressure sensor, a light output sensor, a current sensor, a component temperature sensor, a force sensor (e.g., operatively associated with a window or a build platform), a build platform position sensor, or any combination thereof.

In some systems, the one or more memory resources further store instructions that, when executed by the one or more processors, cause the one or more processors to: (iii) receive a confirmation that said assigned component in inventory has been installed in said printer in place of said subsystem or component thereof for which an indicator of likely failure has been received; and (iv) create a log of all subsystems or components thereof that have been replaced in each printer, and/or a log of all printers in which said subsystem or component thereof has been replaced.

In some systems, the subsystem having the likely failure may be a fluid inhibitor flow circuit (e.g., an oxygen-enriched gas). The component thereof may be a vacuum pump (e.g., a diaphragm pump) operatively associated with said fluid inhibitor flow circuit. The at least one sensor may be a fluid flow sensor operatively associated with said fluid inhibitor flow circuit. The predetermined pattern may include a delayed onset to a desired flow rate of said fluid inhibitor in said fluid flow circuit.

In some systems, the subsystem having the likely failure may be a light engine. The component thereof may be a light source (e.g., a light emitting diode or diode array). The at least one sensor may include a (i) current sensor or (ii) light sensor operatively associated with said light engine. The predetermined pattern may include (i) an increase in current required to drive said light source to a predetermined intensity, or (ii) a decrease in the maximum intensity attainable from said light source (e.g., a decrease in the maximum intensity attainable from an led or led array when driven at maximum current).

In some systems, the subsystem having the likely failure may be a polymerization inhibitor source. The component thereof may be an oxygen concentrator. The at least one sensor may include an oxygen concentration sensor operatively associated with said oxygen concentrator. The predetermined pattern may include an increase in time required to reach a predetermined oxygen concentration or an inability to reach a predetermined oxygen concentration.

Figure 2:
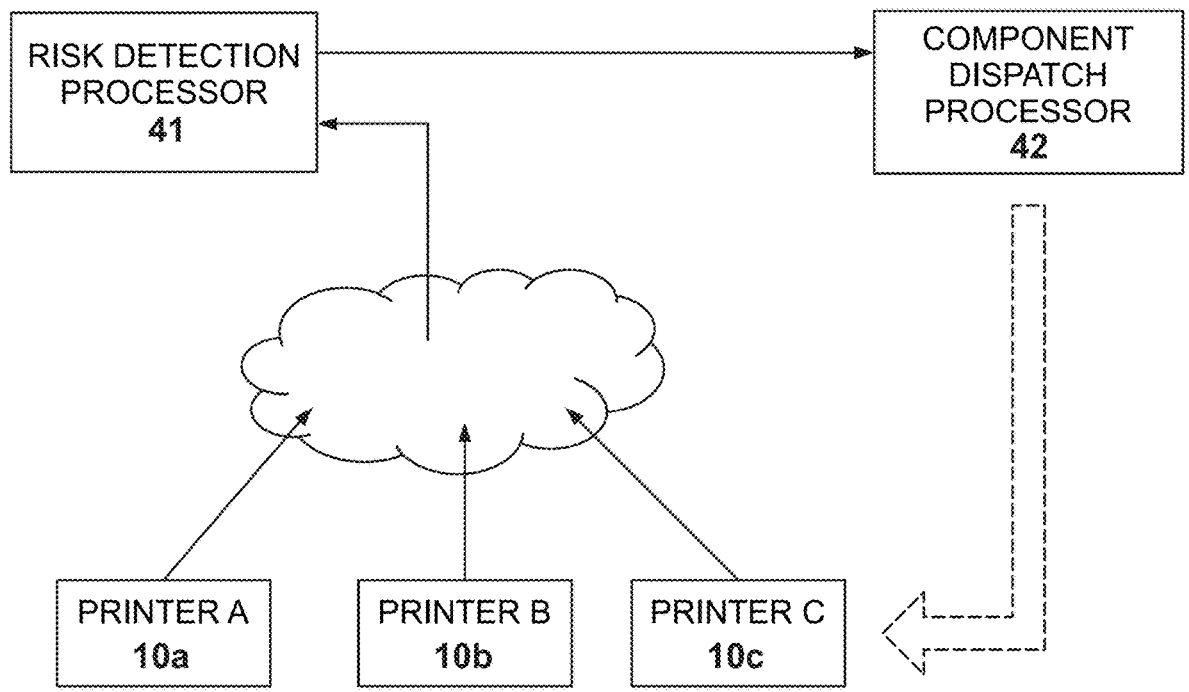
FIG. 2 schematically illustrates one example of a group of additive manufacturing apparatus and system with which the present invention can be implemented.

One example system of the foregoing is given in FIG. 2. The system includes three or more printers 10a, 10b, 10c, as described above, the data storage component of which communicates with a risk detection processor 41 by the internet. The risk detection processor can communicate (directly or via the internee) with a component dispatch processor 42 which contains an inventory of available replacement parts, and an order to deliver an available part to a particular printer can be generated. From there a service technician can take the part out of inventory, and with the order deliver and install the part to an appropriate machine as a preemptory service call. Completion of the replacement installation can be entered by the service technician by any suitable technique, such as by entry into the same processor from which dispatch is generated, entry into an associated application on a smart phone, etc.

Figure 3:
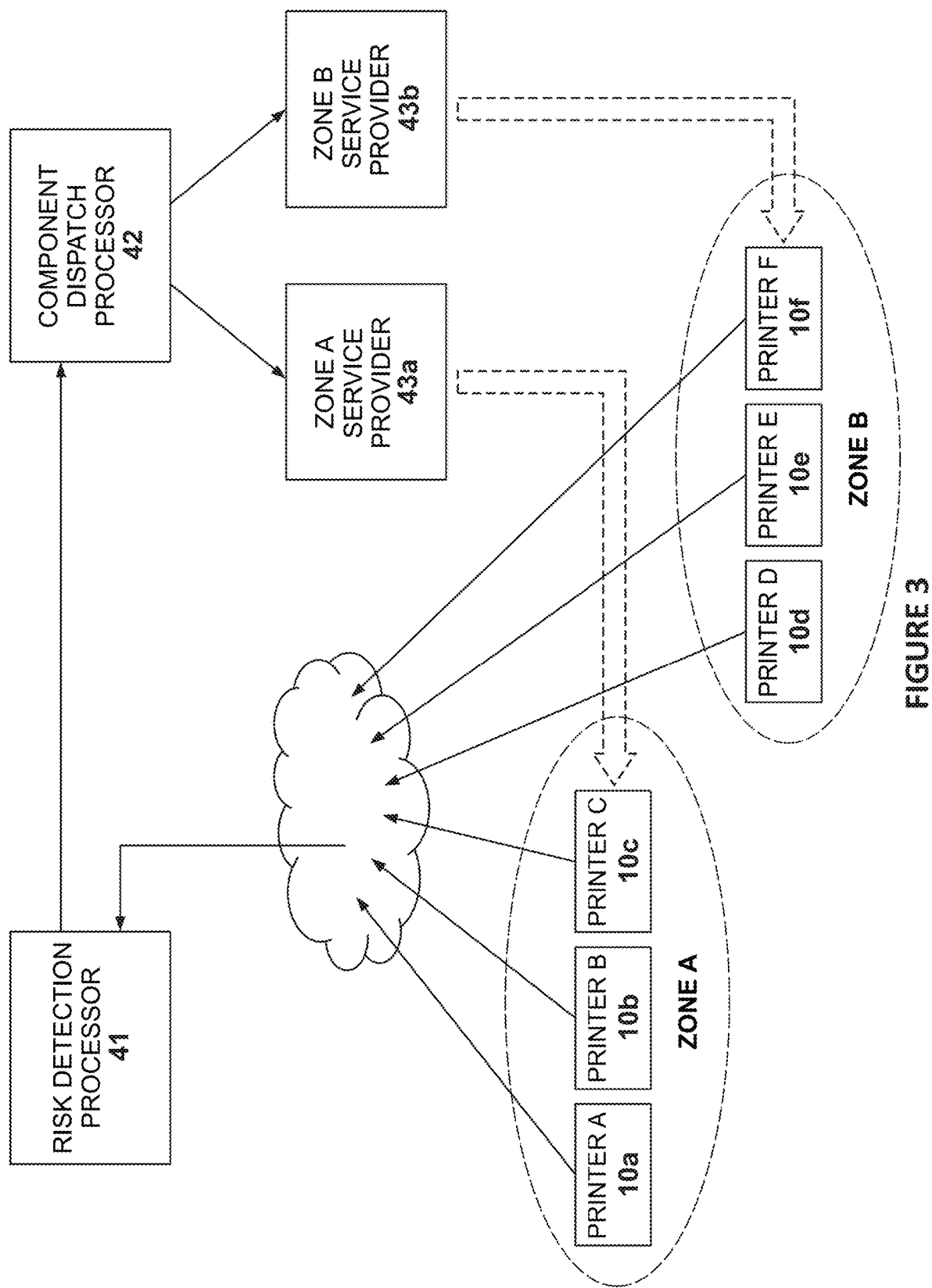
FIG. 3 schematically illustrates a second example of a group of additive manufacturing apparatus and system with which the present invention can be implemented.

FIG. 3 shows a s stem where printers are located in different zones, such as geographically distinct zones. In the illustrated embodiment, Printers 10a, 10b, and 10c are located in Zone A, while printers 10d, 10e, and 10f are located in Zone B. All printers communicate with a risk detection processor 41, which in turn communicates with a component dispatch processor 42, as in FIG. 2 above. However, component dispatch processor communicates part and dispatch orders to different service providers 43a, 43b, assigned to different zones. Service calls and confirmation of replacements can be carried out by the service technicians responsible for different zones in like manner as in FIG. 2.

Figure 4:
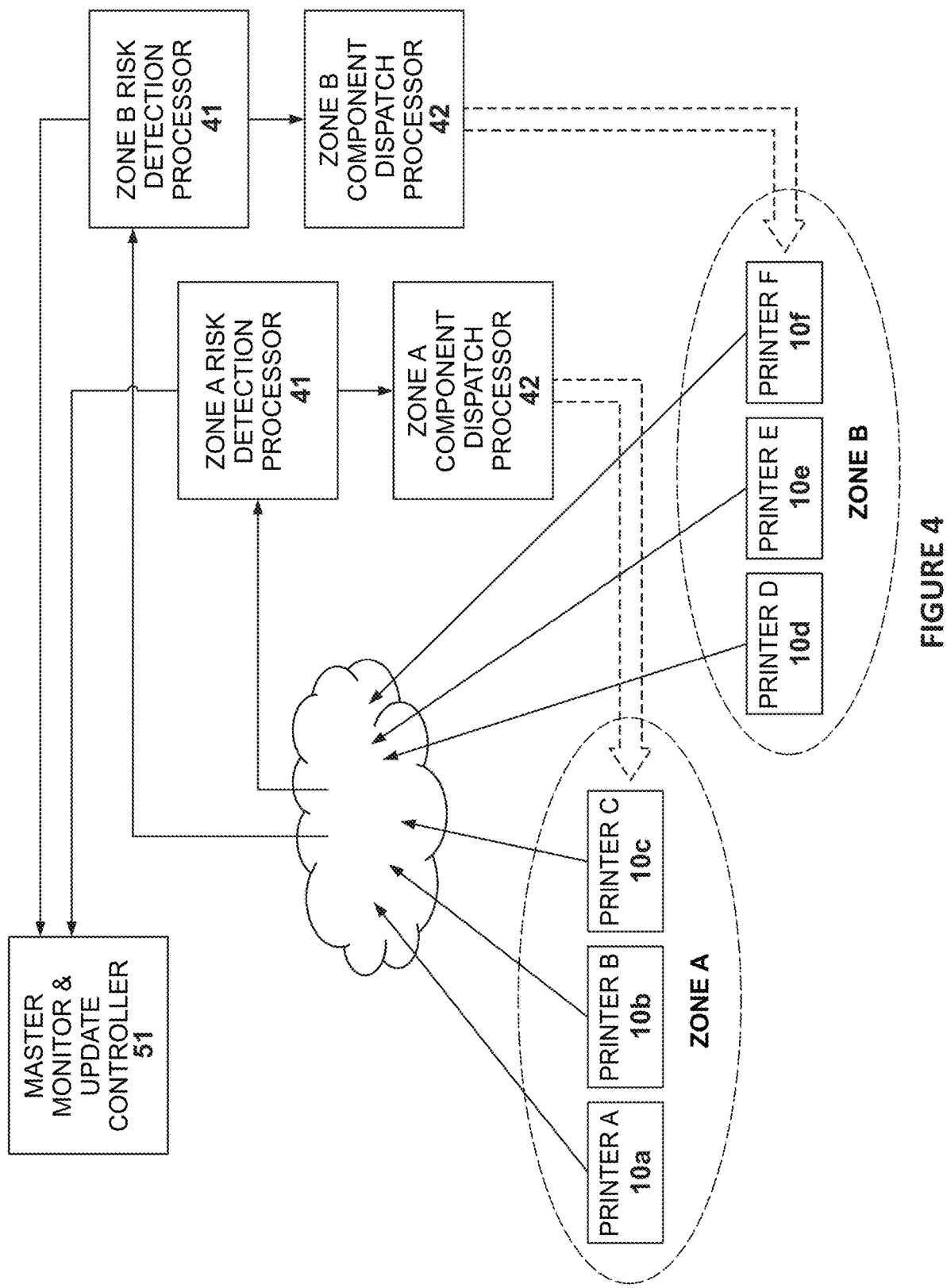
FIG. 4 schematically illustrates a third example of a group of additive manufacturing apparatus and system by which the present invention can be implemented.

FIG. 4 illustrates still another embodiment, similar to those described above, except that now each zone has its own risk detection processor 41. A master monitor controller 51 is included, from which software updates can be provided, and overall performance of machines across multiple zones can be monitored.

From FIGS. 2-4 it will be appreciated that numerous other system architectures can be employed to carry out the present invention.

3. Examples

A non-limiting example of one embodiment of the present invention is given in FIGS. 5-8 herein.

Figure 5:
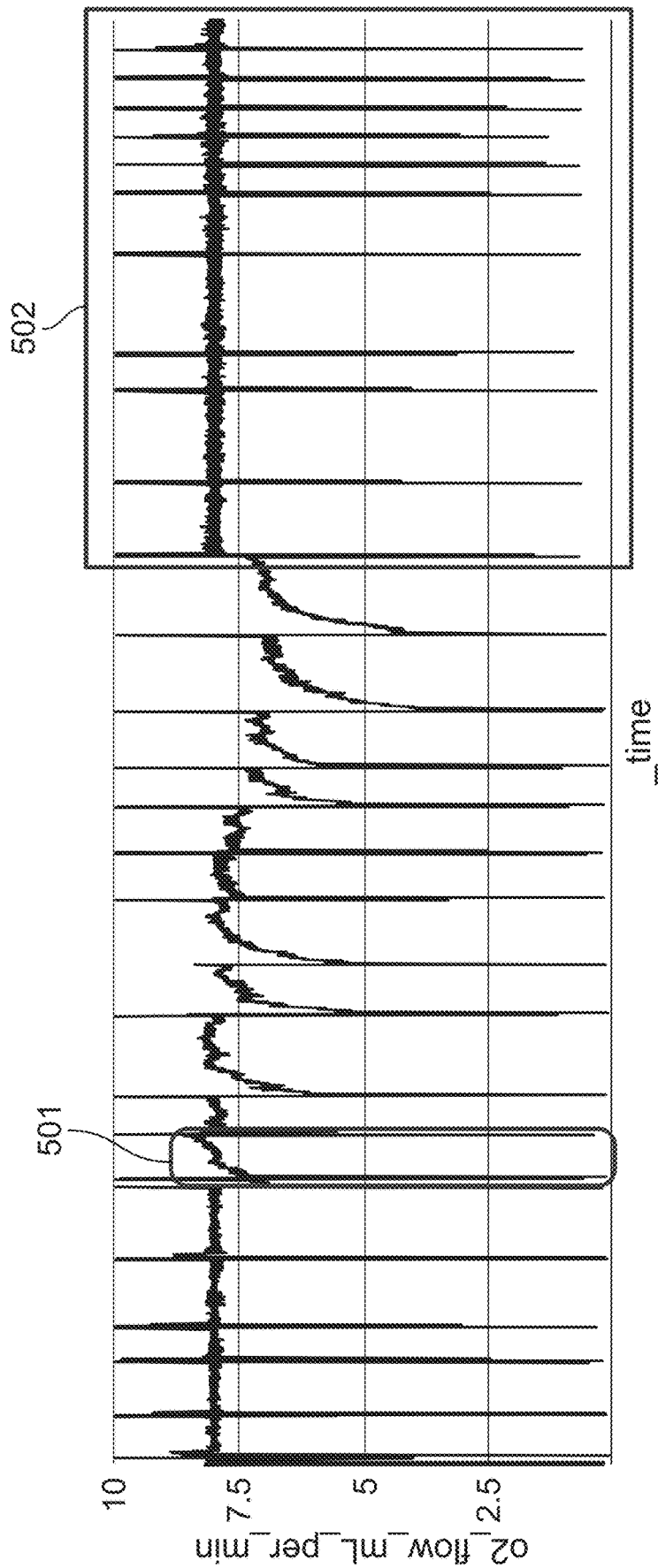
FIG. 5 is a graph illustrating oxygen flow and other telemetry on a plurality of print jobs performed by a print apparatus leading up to a vacuum pump failure and subsequent to replacement of the vacuum pump.

FIG. 5 is a graph showing oxygen flow across the window cassette of a Carbon Inc. M2 apparatus, in the lead-up to and following a vacuum pump failure and subsequent replacement of the failing vacuum pump. FIG. 5 demonstrates an empirical finding that rise-time can serve as an early warning for membrane-tear pump failures. The box 501 highlights the onset of the increased rise-time that is indicative of a tear in the pump membrane beginning or worsening. The return of normal, fast rise-time in later jobs, as seen in graph section 502, corresponds to the replacement of the failing vacuum pump with a new vacuum pump by service personnel.

Figure 6:
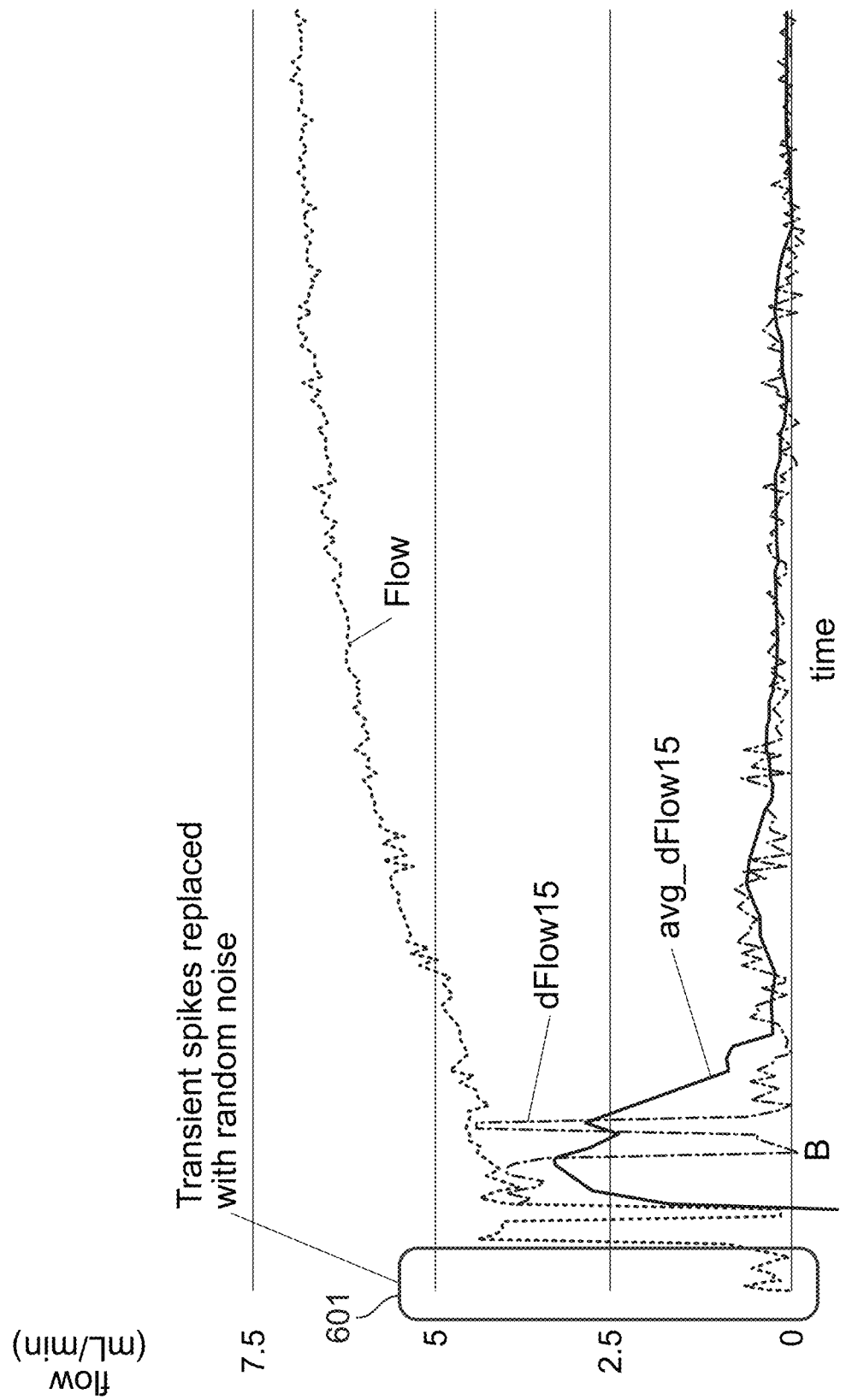
FIG. 6 is a graph illustrating flow on a single print job.

FIG. 6 is a graph showing flow, a "slow" derivative of flow (dF/dt, where dt=150 seconds), and a rolling or moving average of said derivative of flow over a 150 second window. The box 601 identifies approximately the first 100 seconds of flow telemetry, which have been replaced with randomized low-variance noise. This replacement of the early flow telemetry serves to mask out noisy transient flow spikes early in the printing of an object (the "job") that provide no signal and skew derivative calculations.

Figure 7:
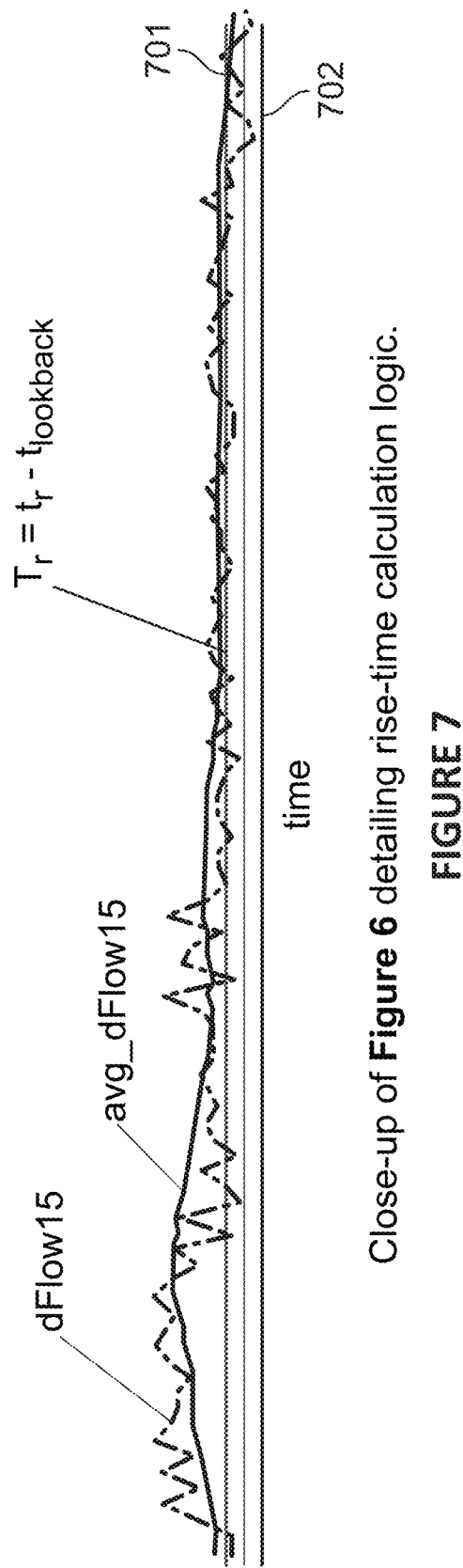
FIG. 7 is an enlargement of a portion of FIG. 6 detailing rise-time calculation logic.

FIG. 7 is an enlargement of a portion of the job telemetry shown in FIG. 6, and focuses on the time range in which flow was calculated to have settled around the set point of approximately 8 mL/min. The horizontal lines 701 and 702 are showing the upper and lower limits, respectively, of a zero-straddling band we defined for the rolling average of the derivative of flow; the first time the rolling average enters this band is at a time $t_r$. From this, $t_{lookback}$, or the amount of time over which the rolling average is calculated, which 150 seconds here—is subtracted to arrive at $T_r$, the estimated time at which settling of flow to the set point initially occurred. Stated differently, $T_r = t_r - t_{lookback}$.

Figure 8:
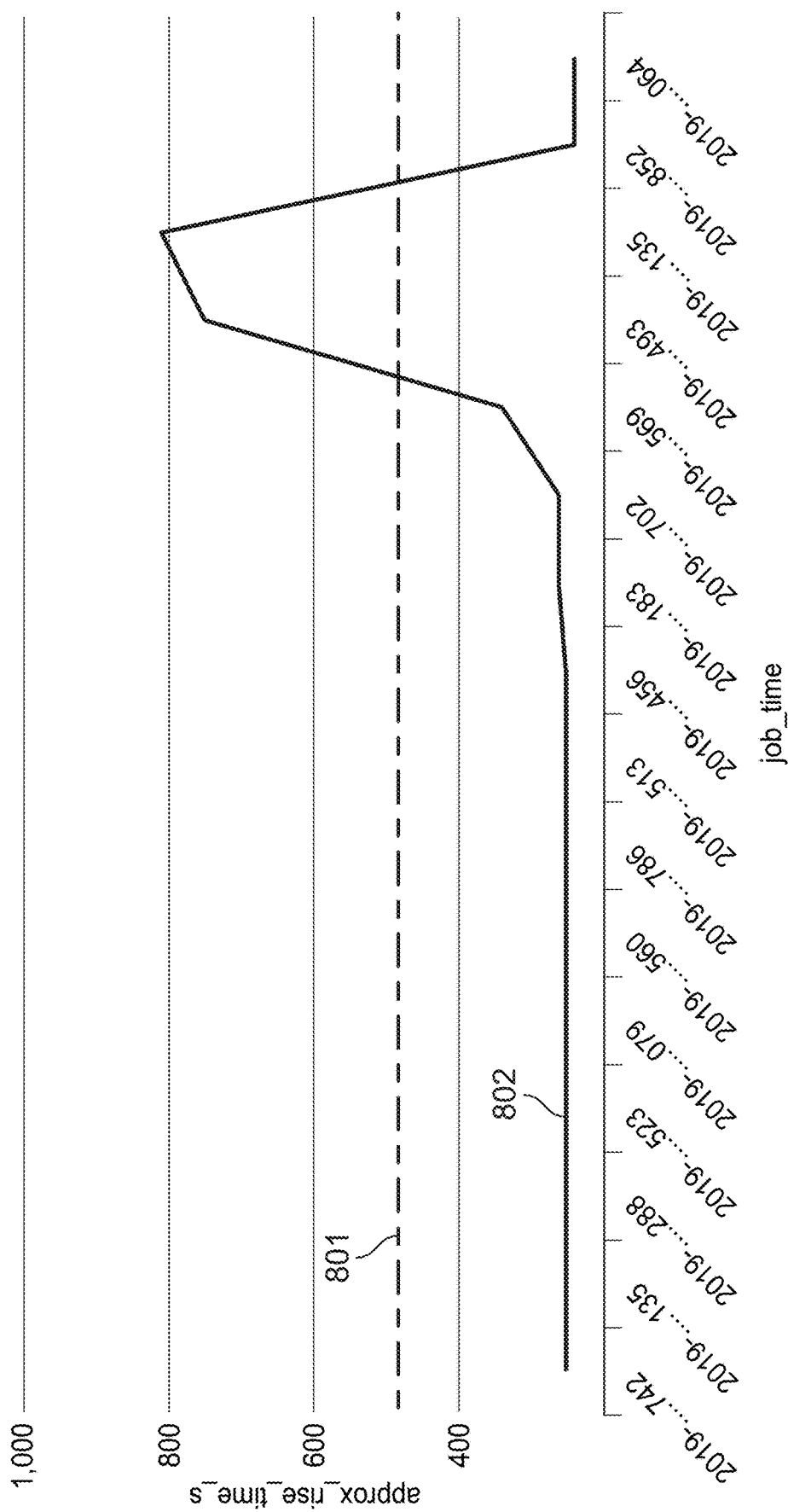
FIG. 8 is a graph illustrating calculated rise-time across print jobs.

FIG. 8 shows the flow rise-time (in units of seconds), as calculated by the method described above, across multiple jobs in the lead-up to a vacuum pump failure. It can be easily seen in data line 802 that there is a significant increase in rise time over this period. This is also visible in the telemetry shown by FIG. 5, but FIG. 8 illustrates a single numerical feature for each job, simplifying characterization and alert thresholding. The continuous horizontal line 801 shows where an empirical alert limit threshold of (for example) 500 seconds sits. At or above this value, a service provider for the printer can be alerted on a per-job basis via suitable monitoring software such as that available from Splunk Inc., San Francisco, CA USA.

The foregoing is illustrative of the present invention, and is not to be construed as limiting thereof. The invention is defined by the following claims, with equivalents of the claims to be included therein.

We claim:

1. A system for preemptively detecting and remediating component failures in printers of three-dimensional objects, the system comprising:
   (a) a plurality of printers each configured to produce three-dimensional objects, each printer including: (i) a plurality of subsystems; (ii) at least one sensor, and (iii) a unique identifier for the printer; and
   (b) one or more processors and one or more memory resources storing an inventory of available replacement components for at least some of said subsystems, said one or more memory resources further storing instructions that, when executed by the one or more processors, cause the one or more processors to:
   (i) identify a predetermined pattern in a signal comprising data sensed during a process of producing a three-dimensional object by the at least one sensor of a printer of the plurality of printers as an indicator of likely failure of a subsystem or component thereof in that printer comprising said at least one sensor; and (ii) assign a component in inventory to said printer based on the unique identifier of the printer and the indicator of likely failure identified in the signal, wherein:
said subsystem comprises a polymerization inhibitor source;
said component comprises an oxygen concentrator;
said at least one sensor comprises an oxygen concentration sensor operatively associated with said oxygen concentrator; and
said predetermined pattern comprises an increase in time required to reach a predetermined oxygen concentration or an inability to reach a predetermined oxygen concentration.

2. The system of claim 1, wherein each of said printers comprises a stereolithography (SLA) apparatus, a selective laser sintering (SLS) apparatus, a fused deposition modeling (FDM) apparatus, or a multi-jet fusion (MJR) apparatus.

3. The system of claim 1, wherein each of said printers comprises a bottom-up stereolithography apparatus.

4. The system of claim 1, wherein said one or more processors comprises a processor that is remote from said plurality of printers.

5. The system of claim 1, said one or more memory resources further storing a physical location for each of said printers based on the unique identifier of the respective printer, wherein assigning a component in inventory comprises assigning a delivery destination to that component based on the physical location.

6. The system of claim 5, said one or more processors further configured to generate a notice to a service technician that the component is to be replaced in the printer to which the component is assigned.

7. The system of claim 1, wherein:
said plurality of printers are located in two or more separate zones;
said inventory of components is subdivided into two or more separate inventory locations, each inventory location assigned to one of said zones; and
assigning a component in inventory to said printer comprises assigning a component in the inventory location corresponding to the zone in which said printer is located.

8. The system of claim 7, said one or more processors further configured to generate a notice to a service technician assigned to that zone.

9. The system of claim 1, wherein said plurality of subsystems comprises: a printer controller, a drive system, a light engine, and a power supply.

10. The system of claim 9, wherein said plurality of subsystems comprises: a polymerization inhibitor supply and/or a temperature regulation system.

11. The system of claim 1, wherein said at least one sensor comprises a gas flow sensor, an oxygen concentration sensor, a gas pressure sensor, a light output sensor, a current sensor, a component temperature sensor, a force sensor, a build platform position sensor, or any combination thereof.

12. The system of claim 1, said one or more memory resources further storing instructions that, when executed by the one or more processors, cause the one or more processors to:

(iii) receive a confirmation that said assigned component in inventory has been installed in said printer in place of said subsystem or component thereof for which an indicator of likely failure has been received; and (iv) create a log of all subsystems or components thereof that have been replaced in each printer, and/or a log of all printers in which said subsystem or component thereof has been replaced.

13. The system of claim 1, wherein:
said subsystem comprises a fluid inhibitor flow circuit,
said component comprises a vacuum pump operatively associated with said fluid inhibitor flow circuit,
said at least one sensor comprises a fluid flow sensor operatively associated with said fluid inhibitor flow circuit, and
said predetermined pattern comprises a delayed onset to a desired flow rate of said fluid inhibitor in said fluid flow circuit.

14. The system of claim 1, wherein:
said subsystem comprises a light engine;
said component comprises a light source;
said at least one sensor comprises a (i) current sensor or (ii) light sensor operatively associated with said light engine; and
said predetermined pattern comprises (i) an increase in current required to drive said light source to a predetermined intensity, or (ii) a decrease in the maximum intensity attainable from said light source.

* * * * *

UNITED STATES PATENT AND TRADEMARK OFFICE
CERTIFICATE OF CORRECTION

PATENT NO. : 12,145,320 B2
APPLICATION NO. : 17/596754
DATED : November 19, 2024
INVENTOR(S) : Gupta et al.

Page 1 of 1

It is certified that error appears in the above-identified patent and that said Letters Patent is hereby corrected as shown below:

In the Specification

Column 2, Line 16: Please correct "multi jet" to read --multi-jet--

Column 5, Line 52: Please correct "multi jet" to read --multi-jet--

Column 7, Line 31: Please correct "internee)" to read --internet)--

Column 7, Line 42: Please correct "s stem" to read --system--

Signed and Sealed this
Eleventh Day of February, 2025

Coke Morgan Stewart
*Acting Director of the United States Patent and Trademark Office*